United States Patent [19]
Farhat

[11] 4,090,204
[45] May 16, 1978

[54] ELECTRONICALLY STEERED ANTENNA SYSTEM USING A REFLECTIVE SURFACE FORMED OF PIEZOELECTRIC TRANSDUCERS

[75] Inventor: Nabil Hassan Farhat, Philadelphia, Pa.

[73] Assignee: RCA Corporation, New York, N.Y.

[21] Appl. No.: 719,402

[22] Filed: Sep. 1, 1976

[51] Int. Cl.² .................. H01Q 19/10; H01Q 3/20
[52] U.S. Cl. ............................ 343/754; 343/915; 350/358
[58] Field of Search ............ 350/161, 285, 161 S; 343/754, 854, 915

[56] References Cited
U.S. PATENT DOCUMENTS

| 3,376,092 | 4/1968 | Kushner et al. | 350/285 |
| 3,904,274 | 9/1975 | Fenleib et al. | 350/285 |
| 3,923,400 | 12/1975 | Hardy | 356/107 |
| 3,978,484 | 8/1976 | Collier | 343/754 |

Primary Examiner—Eli Lieberman
Attorney, Agent, or Firm—Leonard Weiss; Joseph D. Lazar; H. Christoffersen

[57] ABSTRACT

Electronically steered antenna system is provided by placing a panel of dielectric material with specific thickness and dielectric constant spaced forward of an array of piezoelectric transducers. These piezoelectric transducers present a refelective surface. High frequency wavefronts are transmitted toward the dielectric panel and pass on to the reflective surface. The phase of the reflected waves depends upon the spacing of the reflective surfaces from the panel. A change in this spacing is provided by electrical control signals being applied to the piezoelectric transducers.

2 Claims, 3 Drawing Figures

ELECTRONICALLY STEERED ANTENNA SYSTEM USING A REFLECTIVE SURFACE FORMED OF PIEZOELECTRIC TRANSDUCERS

BACKGROUND OF THE INVENTION

This invention relates to electronically steered and focused antenna systems.

A typical phased array antenna system forms a desired beam pattern by imparting a prescribed amplitude-phase distribution over the wave field emanating from its aperture. In the millimeter and submillimeter frequency wave bands, the design and construction of phased arrays with conventional microwave techniques increases in complexity and cost because of the compartment limitations, in particular, phase shifters.

SUMMARY OF INVENTION

Briefly, a less costly and less complex electronically steerable antenna system is provided, including an array of electromechanical displacement devices, each device having a high frequency wave reflecting surface. These reflecting surfaces are closely spaced to each other to form substantially a totally reflecting surface. A dielectric panel is spaced a given distance from the reflecting surface of the devices. High frequency waves are radiated toward the panel to illuminate same and cause illumination of the reflecting surface whereby reflected waves are coupled back through the panel producing a given radiated pattern. Electrical control signals are coupled to the devices for selectively causing the reflecting surfaces to change their spacing relative to the dielectric panel changing the relative phase of the reflected waves and thereby controlling the pattern produced by the reflected waves.

DETAILED DESCRIPTION OF INVENTION

Figure 1:
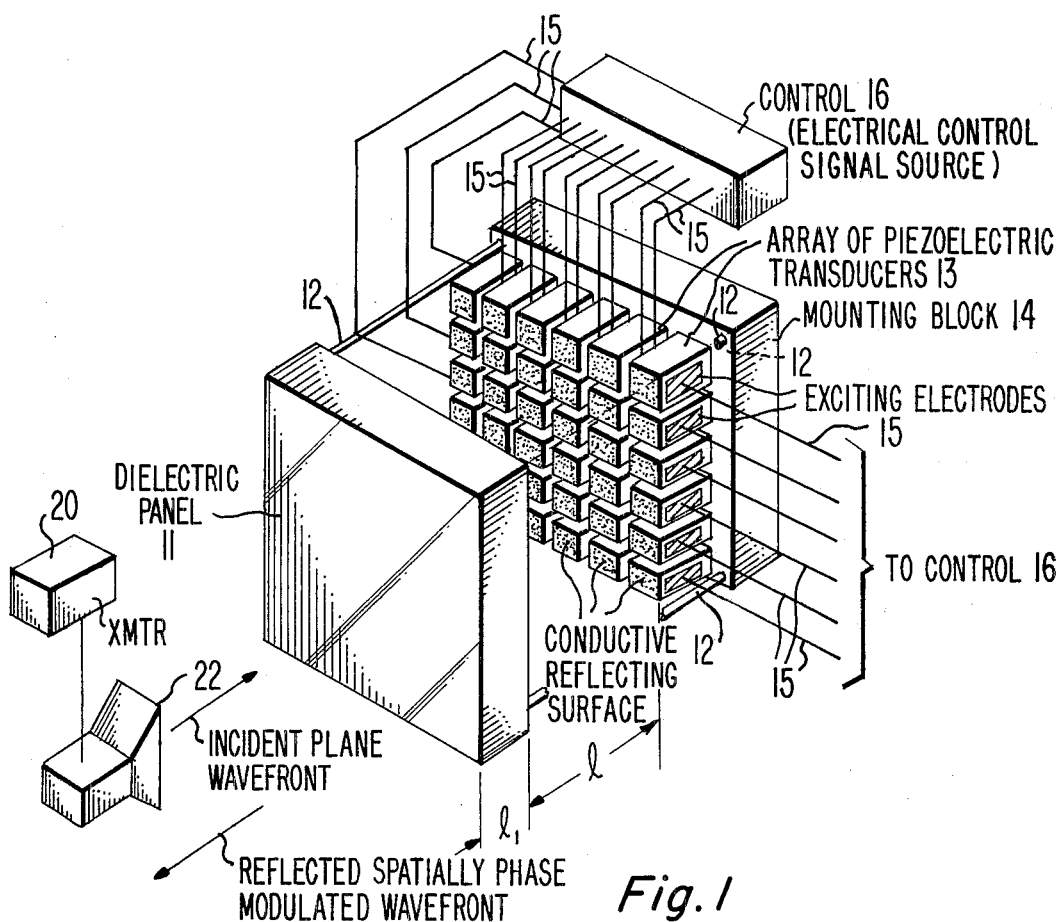
FIG. 1 is a sketch of an antenna system using a reflection type spatial modulation.

Referring to FIG. 1, a panel 11 of dielectric material is mounted by spacers 12 forward of an array of piezoelectric transducers 13 mounted to a block 14. These transducers 13 are surfaced on the end facing the panel 11 with a smooth reflecting mirror like conductive film to form an array of reflecting surfaces. An electrical control signal is coupled from control 16 to the electrodes of each piezoelectric transducers via separate leads 15. When no control signal is applied to the transducers 13, the array of reflecting surfaces forms a smooth flat reflecting mirror like surface a distance $l$ from the panel 11. When control signals are applied to the electrodes of the piezoelectric transducers 13, the transducers individually change their length ($\Delta l$) and in accordance of their distance from the dielectric panel 11 form a distant relief (depth modulation) pattern as determined by the control signals. An incident wave from a transmitter source 20 is coupled to a horn antenna 22. Horn 22 transmits the signals from source 20 toward the dielectric panel 11 and the array of transducers 13. The incident wave from horn 22 is modulated piecewise upon reflection from the array of the transducers 13. This produces a reflected wave which has been phase modulated by the position of the reflecting surfaces of the transducers from their quiescent position. To achieve a phase modulation of $2\pi$ radians, in the absence of the dielectric panel, a change $\Delta l$ in the position of a reflecting element from its quiescent position equal to $\Delta l = \lambda/2$ is required, where $\lambda$ is the wavelength of radiation used. In the millimeter wave region, this amounts to the surface relief structure with depth modulation of the order of a few millimeters. Although, this is not difficult to achieve statically in millimeter wave gratings of the type used in millimeter wave spectroscopy, it is a major problem however when such gratings are required to change their surface relief structure in a short time duration. A solution to this problem is achieved by the panel 11 of dielectric material. The presence of the dielectric panel appreciably reduces the required depth of relief modulation of the grating needed in order to achieve useful phase modulation. Depending on the dielectric constant and thickness of the dielectric panel 11, the required relief modulation can be reduced to values compatible with piezoelectrically produced displacements of the transducers 13.

The expression for the complex reflection coefficient of the dielectric slab-air gap-reflection mirror sandwich structure shown in FIG. 1 can be reduced to $$\Gamma = |\Gamma| e^{j\phi} \quad (1)$$

where $$|\Gamma| = 1 \quad (2)$$

and $$\phi = -\pi + 2\tan^{-1}\left(\frac{\tan\beta_o l + 1}{\epsilon_r \tan\beta_o l - 1}\right) \quad (3)$$

($\beta_o = 2\pi/\lambda_o$ where $\lambda_o$ is free space wavelength) by choosing the dielectric slab thickness $l_1$ and its relative dielectric constant $\epsilon_r$ such that, $$\tan\beta l_1 = \sqrt{\epsilon_r} \quad (4)$$

($\beta = 2\pi/\lambda$ and $\lambda$ is wavelength in the dielectric)

Figure 2:
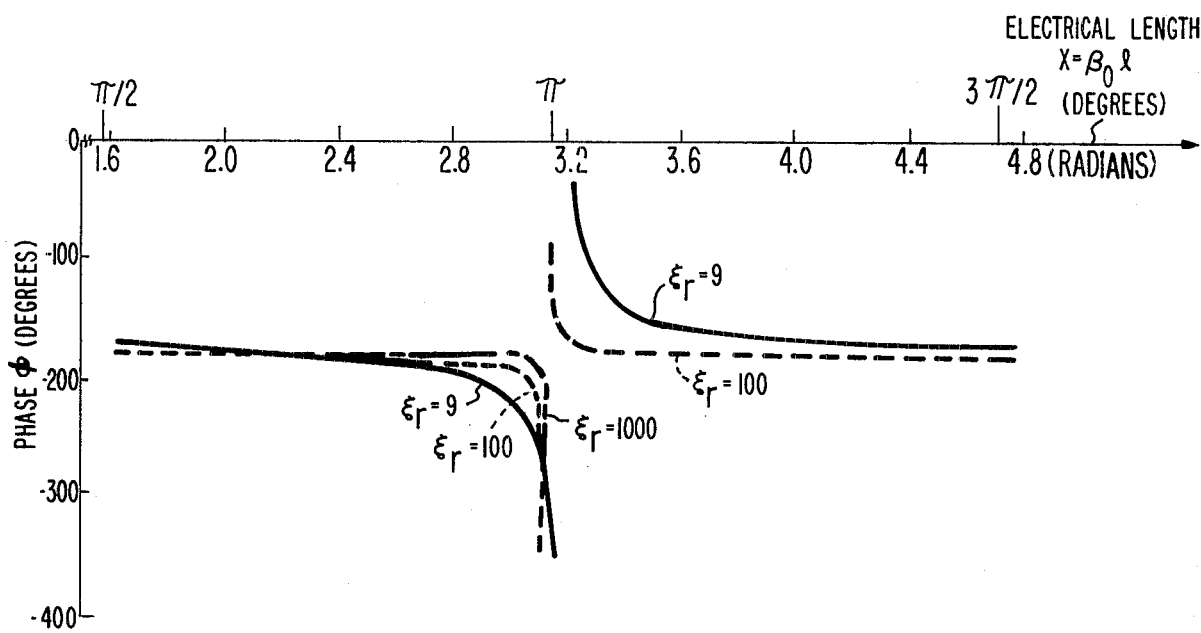
FIG. 2 is a plot of phase $\phi$ reflected signal vs. electric length $x = \beta_o l$ of airgap with $\epsilon_r$ as parameter.
Figure 3:
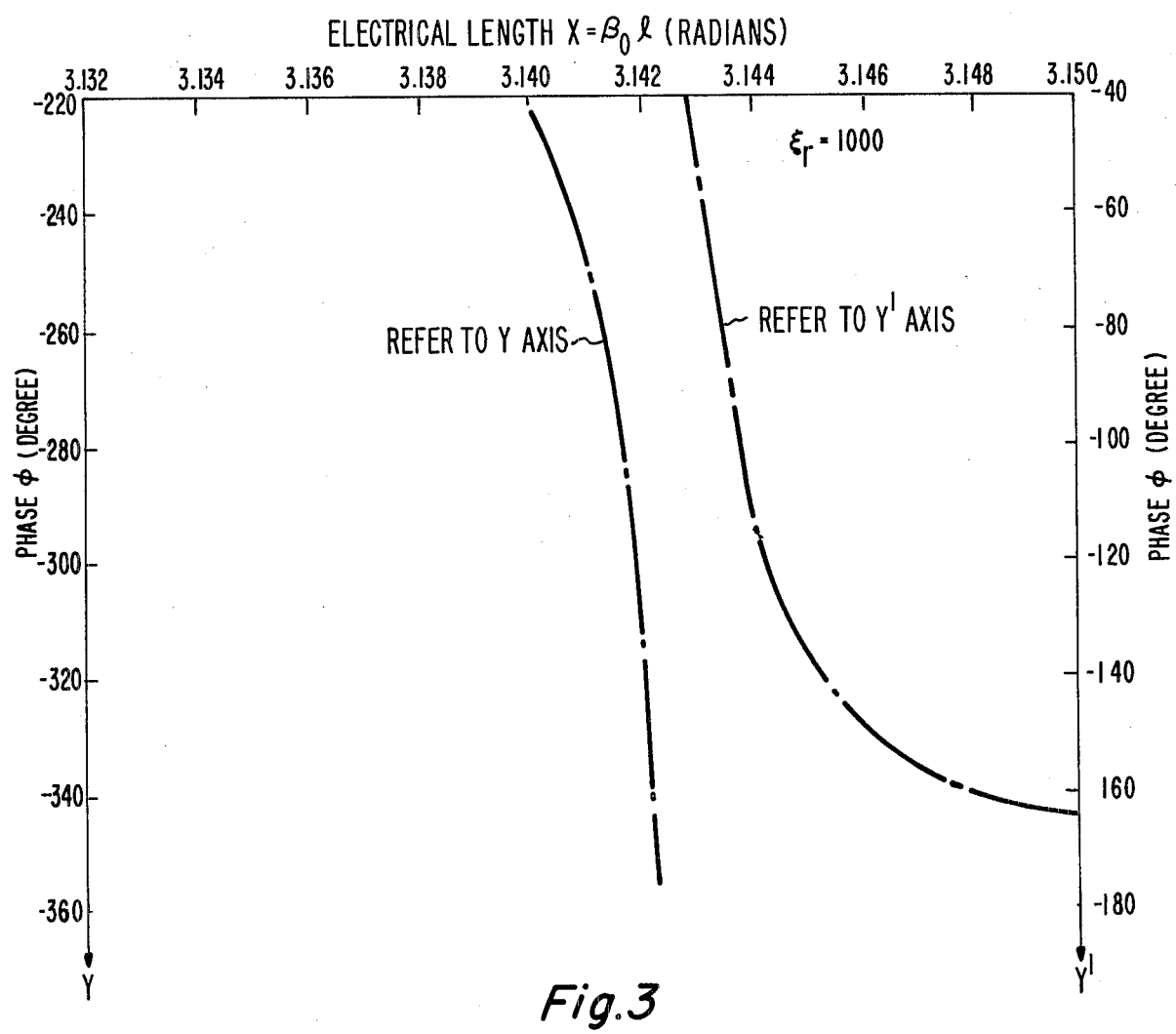
FIG. 3 is a plot of phase $\phi$ of reflected signal vs. electric length $x = \beta_o l$ of airgap for $\epsilon_r = 1000$.

Expression (3) indicates that it would be desirable to choose dielectric with large $\epsilon_r$ since this produces a high rate of change of phase shift $\phi$ with air gap length $l$. In this fashion, one can realize a purely phase modulating reflecting microwave mirror capable of producing large phase excursions with small changes in $l$. FIG. 2 shows the computed dependence of phase angle of the reflected signal on the electric length $x = \beta_o l$ of the air gap for dielectric panels of three different materials: Alumina ($\epsilon_r = 9$), Titanium Oxide ($\epsilon_r \approx 100$) and Barium titanate ($\epsilon_r \approx 1000$). It is seen that the higher the dielectric constant, the smaller is the change in air gap required to achieve useful phase modulation. The dependence of phase shift $\phi$ on normalized air gap length in this case is plotted in FIG. 3 by expanding the $x$ scale. In FIG. 3, the phase of the reflected signals for electrical lengths greater than 3.1425 radians (curve on the right) is presented on the right $y'$-axis and the phase of the reflected signals for electrical lengths less than 3.1425 radians (curve on the left) is pesented on the left y-axis. A total change in air gap dimensions by 0.2 electrical degrees or $\Delta l = 2.55 \mu m$ (micrometers) can produce a phase excursion of 250° at $\lambda = 4$ mm. Displacements of a few microns are easily achieved with electricaly activated piezoelectric transducers.

The array of piezoelectric transducers can be, for example, one or two wavelengths across and the dielectric panel 11 may be made of Barium titanate. The thickness of the Barium titanate panel in this example as predicted by equation (4) will be $$l_1 = \frac{1}{\beta} \tan^{-1} \sqrt{\epsilon_r} = \frac{\lambda_o}{2\pi \sqrt{\epsilon_r}} \tan^{-1} \sqrt{\epsilon_r}$$

Substituting $\epsilon_r = 1000$ we find $l_1 = 31\mu$m. Since this thickness is small for adequate mechanical supportings, a self-supporting panel can be had by adding to the above value of $l_1$. Additional material of thickness $n\lambda = n\lambda_o \sqrt{\epsilon_r}$ where $n$ is an integer ($\mu_o$ is free space wavelength and $\mu$ is wavelength in dielectric). Thus, by making $n = 20$ for example the dielectric panel thickness would be $0.63 \lambda_o + l_1 = 2.562$ mm. Because of the fine displacement $\Delta l$ required to modulate the phase appreciably, nearly optical polish of the dielectric panel and the piezoelectric transducers forming the interferometric structure would be required.

This invention provides thus a simple and low-cost way of electronically steering a beam by properly addressing transducers 13 from control 16. Such structures can be used in the construction of a new low cost electronically steered and focused millimeter wave antennas. Since these structures can modulate the spatial phase distribution in a reflected wavefront at megahertz rates when piezoelectric displacement devices are utilized, beam steering at a rate of a few million different beam directions or patterns per second becomes possible.

What is claimed is:

1. An electronically steerable antenna system for high frequency waves comprising:
   an array of electromechanical displacement devices, each device having a high frequency wave reflecting surface with said reflecting surfaces closely spaced to each other forming substantially a total radio frequency wave reflecting surface,
   a flat dielectric panel spaced a given distance from the reflecting surface of the devices, the thickness of the panel $l_1$ and the relative dielectric constant $\epsilon_r$ of the panel material is such that, $$\tan \beta \, l_1 = \sqrt{\epsilon_r}$$

where $\beta$ is $2\pi/\lambda$ where $\lambda$ is a wavelength in the panel,
   means adapted to be coupled to a source of radio frequency waves for radiating high frequency waves toward said panel illuminating same and causing illumination of the reflecting surfaces whereby reflected waves coupled back through the panel produce a given radiated pattern,
   means for providing electrical control signals for changing or steering said pattern, and
   means responsive to said control signals and coupled to said devices for selectively causing said reflecting surfaces to change their spacing relative to the dielectric panel to change the relative phase of the reflected waves and thereby control the far field pattern produced by the reflected waves, said dielectric panel being of a specific thickness and dielectric constant to increase the relative phase changes produced by the devices.

2. The combination of claim 1 wherein said electromechanical displacement devices are piezoelectric transducers.

* * * * *

UNITED STATES PATENT OFFICE
CERTIFICATE OF CORRECTION

PATENT NO. : 4,090,204
DATED : May 16, 1978
INVENTOR(S) : Nabil Hassan Farhat

It is certified that error appears in the above-identified patent and that said Letters Patent are hereby corrected as shown below:

Column 1, lines 16 and 17, "compartment" should be --component--;

Column 1, line 54, "transducers" should be --tranducer--;

Column 3, line 18, "μ" should be --$\lambda_o$--;

Column 3, line 19, "μ" should be --$\lambda$--.

*Signed and Sealed this*

*Twenty-first* Day of *November 1978*

[SEAL]

Attest:

RUTH C. MASON
*Attesting Officer*

DONALD W. BANNER
*Commissioner of Patents and Trademarks*